（12）United States Patent
Yang et al.

(10) Patent No.: US 12,245,073 B2
(45) Date of Patent: Mar. 4, 2025

(54) CONGESTION CONTROL METHOD, APPARATUS AND SYSTEM, DEVICE AND MEDIUM

(71) Applicant: ZTE Corporation, Shenzhen (CN)

(72) Inventors: Kun Yang, Shenzhen (CN); Xiaoquan Hua, Shenzhen (CN); Jianfeng Ding, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 291 days.

(21) Appl. No.: 17/764,294

(22) PCT Filed: Jan. 13, 2021

(86) PCT No.: PCT/CN2021/071418
§ 371 (c)(1),
(2) Date: Mar. 28, 2022

(87) PCT Pub. No.: WO2021/164471
PCT Pub. Date: Aug. 26, 2021

(65) Prior Publication Data
US 2022/0345935 A1    Oct. 27, 2022

(30) Foreign Application Priority Data

Feb. 19, 2020   (CN) .......................... 202010102683.7

(51) Int. Cl.
*G16Y 10/75*     (2020.01)
*H04L 41/0654*   (2022.01)
(Continued)

(52) U.S. Cl.
CPC ..... *H04W 28/0289* (2013.01); *H04L 41/0654* (2013.01); *H04L 43/0876* (2013.01);
(Continued)

(58) Field of Classification Search
CPC ........ G16Y 10/70–75; G16Y 40/10–40; H04L 41/02–5096; H04L 43/02–55;
(Continued)

(56) References Cited

U.S. PATENT DOCUMENTS

| | | | |
|---|---|---|---|
| 2008/0104273 A1* | 5/2008 | Bruck | H04L 67/101 |
| 2017/0295514 A1* | 10/2017 | Uchida | H04L 67/1008 |
| 2018/0139274 A1* | 5/2018 | Gandhi | H04L 67/1046 |

FOREIGN PATENT DOCUMENTS

| | | |
|---|---|---|
| CN | 102378264 A | 3/2012 |
| CN | 204376932 U | 6/2015 |

(Continued)

OTHER PUBLICATIONS

Extended European Search Report for European Application No. 21756626.4, dated Jun. 25, 2024.
(Continued)

*Primary Examiner* — Timothy J Weidner
(74) *Attorney, Agent, or Firm* — Wolf, Greenfield & Sacks, P.C.

(57) ABSTRACT

A congestion control method, apparatus and system, and a non-transitory computer-readable storage medium are disclosed. The congestion control method, which is applied to a first gateway, may include: monitoring node state information of a second gateway, where the second gateway is a collaboration gateway of the first gateway; and performing at least one of: in response to the node state information indicating a traffic overload of the second gateway, notifying a central gateway of the traffic overload of the second gateway, and sending a traffic collaboration request of the second gateway to an application server; or in response to the node state information indicating a service recovery of the second gateway, notifying the central gateway of the service recovery of the second gateway, and sending a
(Continued)

service collaboration revocation request of the second gateway to the application server.

15 Claims, 4 Drawing Sheets

(51) Int. Cl.

| | | |
|---|---|---|
| *H04L 43/0876* | (2022.01) | |
| *H04L 47/122* | (2022.01) | |
| *H04L 67/288* | (2022.01) | |
| *H04W 4/70* | (2018.01) | |
| *H04W 16/04* | (2009.01) | |
| *H04W 28/02* | (2009.01) | |
| *H04W 28/08* | (2023.01) | |
| *H04W 28/12* | (2009.01) | |
| *H04W 84/02* | (2009.01) | |
| *H04W 88/08* | (2009.01) | |
| *H04W 88/14* | (2009.01) | |
| *H04W 88/16* | (2009.01) | |
| *H04W 92/02* | (2009.01) | |
| *H04W 92/04* | (2009.01) | |
| *H04W 92/24* | (2009.01) | |

(52) U.S. Cl.
CPC .......... *H04L 47/122* (2013.01); *H04L 67/288* (2013.01); *H04W 4/70* (2018.02); *H04W 16/04* (2013.01); *H04W 28/0215* (2013.01); *H04W 28/0942* (2020.05); *H04W 28/12* (2013.01); *G16Y 10/75* (2020.01); *H04W 84/02* (2013.01); *H04W 88/08* (2013.01); *H04W 88/14* (2013.01); *H04W 88/16* (2013.01); *H04W 92/02* (2013.01); *H04W 92/045* (2013.01); *H04W 92/24* (2013.01)

(58) Field of Classification Search
CPC ....... H04L 47/10–83; H04L 67/01–75; H04W 4/30–70; H04W 16/02–12; H04W 28/02–26; H04W 84/02–16; H04W 88/005–188; H04W 92/02–24
See application file for complete search history.

(56) References Cited

FOREIGN PATENT DOCUMENTS

| | | |
|---|---|---|
| CN | 109308233 A | 2/2019 |
| CN | 110311800 A | 10/2019 |
| CN | 110753002 A | 2/2020 |
| JP | 2014-138284 A | 7/2014 |
| WO | WO 2015/106565 A1 | 7/2015 |
| WO | WO 2016/045325 A1 | 3/2016 |

OTHER PUBLICATIONS

[No. Author Listed] SA WG2 Meeting #96, Agenda Item 7.10: S-GW/P-GW Overload Prevention. S2-131064. Apr. 8-12, 2013:1-3.

Caione et al., Compressive sensing optimization for signal ensembles in WSNs. IEEE Transactions on Industrial Informatics. Feb. 2014;10(1):382-92.

International Search Report and Written Opinion for International Application No. PCT/CN2021/071418, mailed Mar. 30, 2021.

First Office Action for Korean Application No. 20227007750 mailed Aug. 19, 2024.

\* cited by examiner

CONGESTION CONTROL METHOD, APPARATUS AND SYSTEM, DEVICE AND MEDIUM

CROSS-REFERENCE TO RELATED APPLICATION

This application is a national stage filing under 35 U.S.C. § 371 of international application number PCT/CN2021/071418, filed on Jan. 13, 2021, which claims priority to Chinese patent application No. 202010102683.7 filed on Feb. 19, 2020. The contents of these applications are incorporated herein by reference in their entirety.

TECHNICAL FIELD

The present disclosure relates to the technical field of communications, in particular to a congestion control method, apparatus and system, a device and a non-transitory computer-readable storage medium.

BACKGROUND

Massive machine type communication (mMTC), as one of the three application scenarios defined by the 5th generation mobile communication technology (5G), features a device connection density 10-100 times higher than that in the 4th generation mobile communication technology (4G), and supports the connection of 1 million devices per square kilometer, and at least 100 billion devices in total. With such massive access, network congestion is inevitable, and how to realize congestion control has become a burning issue.

SUMMARY

The present disclosure provides a congestion control method, apparatus and system, a device and a non-transitory computer-readable storage medium to realize congestion control and meet the application requirements of 5G Internet of Things (IoT).

An embodiment of the present disclosure provides a congestion control method applied to a first gateway, which may include:
  monitoring node state information of a second gateway, where the second gateway is a collaboration gateway of the first gateway;
  in response to the node state information indicating a traffic overload of the second gateway, notifying a central gateway of the traffic overload of the second gateway, and sending a traffic collaboration request of the second gateway to an application server;
  and/or, in response to the node state information indicating a service recovery of the second gateway, notifying the central gateway of the service recovery of the second gateway, and sending a service collaboration revocation request of the second gateway to the application server.

An embodiment of the present disclosure provides a congestion control method applied to a central gateway, which may include:
  adjusting a collaboration relationship between managed gateways according to a network state of a current network, after a notification of a traffic overload of a second gateway sent by a first gateway is received and/or after a notification of a traffic recovery of the second gateway sent by the first gateway is received, where the second gateway is a collaboration gateway of the first gateway.

An embodiment of the present disclosure provides a congestion control method applied to an application server, which may include:
  performing traffic forwarding setting for a second gateway in response to receiving a traffic collaboration request of the second gateway sent by a first gateway, where the second gateway is a collaboration gateway of the first gateway.

An embodiment of the present disclosure provides a congestion control system, which may include: an application server, a central gateway and at least one first gateway, where
  the central gateway is connected with the application server and each first gateway, and is configured to adjust a collaboration relationship between managed gateways according to a network state of a current network and send a collaboration relationship update message of the current network to the application server;
  the first gateway is connected with the application server and the second gateway, and is configured to monitor node state information of the second gateway, notify the central gateway of a traffic overload or recovery of the second gateway according to the node state information, and send a traffic collaboration request or traffic collaboration revocation request of the second gateway to the application server, where the second gateway is a collaboration gateway of the first gateway; and
  the application server is configured to perform traffic forwarding setting for the second gateway in response to receiving the traffic collaboration request of the second gateway sent by the first gateway, or perform traffic forwarding revocation setting for the second gateway in response to receiving the traffic collaboration revocation request of the second gateway sent by the first gateway.

An embodiment of the present disclosure provides a congestion control apparatus applied to a first gateway, which may include:
  a monitoring module configured to monitor node state information of a second gateway, where the second gateway is a collaboration gateway of the first gateway; and
  a reporting and requesting module configured to, in response to the node state information indicating a traffic overload of the second gateway, notify a central gateway of the traffic overload of the second gateway, and send a traffic collaboration request of the second gateway to an application server;
  and/or, in response to the node state information indicating a service recovery of the second gateway, notify the central gateway of the service recovery of the second gateway, and send a service collaboration revocation request of the second gateway to the application server.

An embodiment of the present disclosure provides a congestion control apparatus applied to a central gateway, which may include:
  a collaboration relationship adjustment module configured to adjust a collaboration relationship between managed gateways according to a network state of a current network after receiving a notification of a traffic overload of a second gateway sent by a first gateway and/or after receiving a notification of a traffic recovery of the second gateway sent by the first gateway, where the second gateway is a collaboration gateway of the first gateway.

An embodiment of the present disclosure provides a congestion control apparatus applied to an application server, which may include:

a congestion control module configured to perform traffic forwarding setting for a second gateway in response to receiving a traffic collaboration request of the second gateway sent by a first gateway, where the second gateway is a collaboration gateway of the first gateway.

An embodiment of the present disclosure provides a gateway, which may include: at least one processor; and a storage apparatus, configured to store at least one program, where the at least one program, when executed by the at least one processor, causes the at least one processor to implement the congestion control method applied to the first gateway according to any one of the embodiments of the present disclosure, or implement the congestion control method applied to the central gateway according to any one of the embodiments of the present disclosure.

An embodiment of the present disclosure provides an application server, which may include: at least one processor; and a storage apparatus, configured to store at least one program, where the at least one program, when executed by the at least one processor, causes the at least one processor to implement the congestion control method applied to the application server according to any one of the embodiments of the present disclosure.

An embodiment of the present disclosure provides a non-transitory computer-readable storage medium storing a computer program which, when executed by a processor, implements the congestion control method according to any of the embodiments of the present disclosure.

DETAILED DESCRIPTION

The embodiments of the present disclosure will be described in detail below with reference to the accompanying drawings. It should be noted that any combinations of embodiments and features of the embodiments of the present disclosure without conflict are possible.

Figure 1:
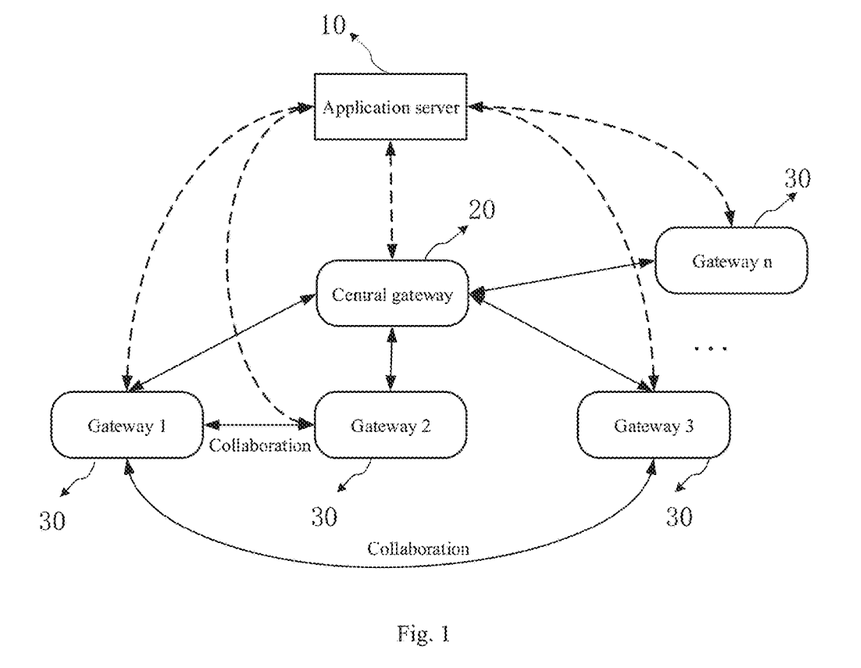
FIG. 1 is a schematic diagram of a congestion control system according to the present disclosure.

In order to facilitate understanding of the congestion control method provided by the present disclosure, a congestion control system provided by the present disclosure will be briefly explained first. As shown in FIG. 1, the congestion control system according to the present disclosure includes: an application server 10, a central gateway 20 and at least one first gateway 30 (i.e., gateways 1 to n in FIG. 1).

Here, the central gateway 20 is connected with the application server 10 and each first gateway 30, and is configured to adjust a collaboration relationship between managed gateways according to a network state of a current network and send a collaboration relationship update message of the current network to the application server 10.

The first gateway 30 is connected with the application server 10 and the second gateway, and is configured to monitor node state information of the second gateway, notify the central gateway 20 of a traffic overload or recovery of the second gateway according to the node state information, and send a traffic collaboration request or traffic collaboration revocation request of the second gateway to the application server 10. Here, the second gateway is a collaboration gateway of the first gateway 30; assuming that the first gateway 30 is the gateway 1 in FIG. 1, its collaboration gateways are the gateway 2 and the gateway 3, in which case the gateway 2 may be referred to as the second gateway, and the gateway 3 may also be referred to as the second gateway.

The application server 10 is configured to perform traffic forwarding setting for the second gateway in response to receiving the traffic collaboration request of the second gateway sent by the first gateway 30, or perform traffic forwarding revocation setting for the second gateway in response to receiving the traffic collaboration revocation request of the second gateway sent by the first gateway 30.

Specifically, every gateway in the network needs to upload data information to the application server, where the first gateway is an ordinary gateway in the network, and each first gateway has at most two collaboration gateways, which can monitor each other's survival status and back up each other's data information; and the central gateway is a special first gateway selected from the network, and one central gateway is provided, which not only has all the functions of an ordinary gateway, but also has a designated function, that is, to assign collaboration gateways to all gateways in the network according to the network state, specifically, to assign collaboration gateways to all gateways in the network according to information such as network topology and node state. The application server performs traffic forwarding setting for the second gateway according to the traffic collaboration request of the second gateway sent by the first gateway, or performs traffic forwarding revocation setting for the second gateway in response to receiving the traffic collaboration revocation request of the second gateway sent by the first gateway.

Figure 2:
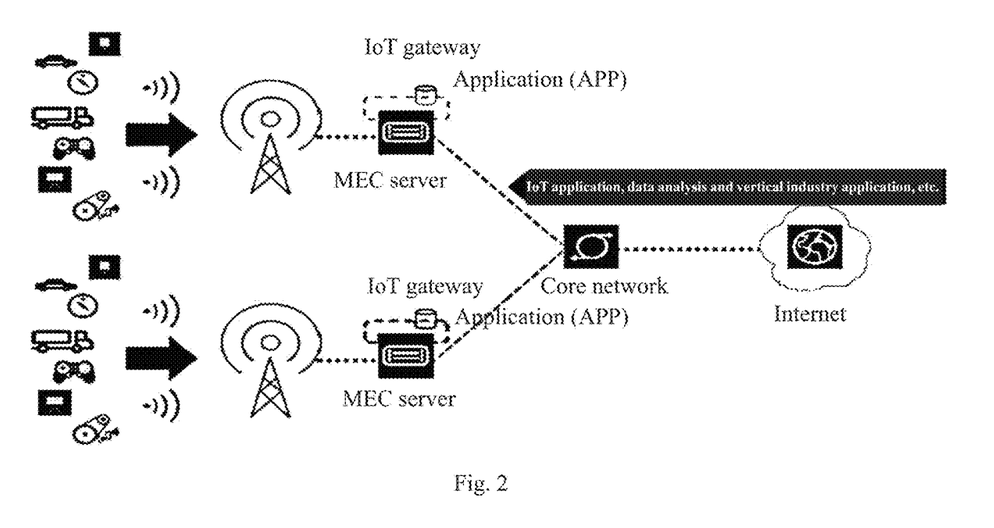
FIG. 2 is a schematic diagram of an IoT border gateway according to the present disclosure.

In an implementation, the gateways involved in the present disclosure may be IoT gateways or other types of gateways, and may be independent gateway devices or deployed in other devices. For example, as shown in FIG. 2, the IoT gateways may also be deployed in a mobile edge computing (MEC) server which shares a unified address with a base station; in this way, the round-trip delay of service delivery can be effectively reduced, and computing-intensive functions such as big data analysis can be supported by means of the strong processing capacity of the MEC server.

Here, the basic idea of MEC is to migrate a cloud computing platform from the inside of the network to the edge of the network, so as to reduce the end-to-end delivery delay of mobile services, effectively prevent network congestion, explore the inherent capabilities of wireless networks, enhance user experience, and promote service innovation. The so-called "edge" includes not only mobile terminals and mobile communication base stations, but also other specific devices in the wireless network (such as base station aggregation nodes).

As a link between a sensor network and a traditional communication network, the IoT gateway is an indispensable core device in a wireless sensor network. Typically, with limited computing and storage resources, the IoT device at an end point of the network is unable to support a traditional transmission control protocol/Internet protocol (TCP/IP) stack, and can only run simple communication protocols, so the IoT gateway needs to perform relevant protocol conversion functions to support access control requests from the Internet.

With the popularization of IoT applications, some delay-sensitive services (such as intelligent industrial control) have emerged, and an MEC system provides support for such IoT services. In an implementation, by deploying the IoT gateways in the MEC system in the form of software, many different IoT protocols can be supported by means of the processing capacity of an edge server while ensuring low latency, and more functions can be provided to enhance the manageability of an IoT network, thus simplifying deployment and improving service flexibility.

Correspondingly, a central IoT gateway needs to be determined in the IoT network, and each IoT gateway needs to upload data information to the IoT application server, where each IoT gateway has at most two collaboration gateways, and the collaboration IoT gateways can monitor each other's survival status and back up each other's data information; and the central IoT gateway has all the functions of ordinary IoT gateways, and also has a specific function, that is, to assign collaboration gateways to all IoT gateways in the IoT network according to information such as network topology and node state.

Figure 3:
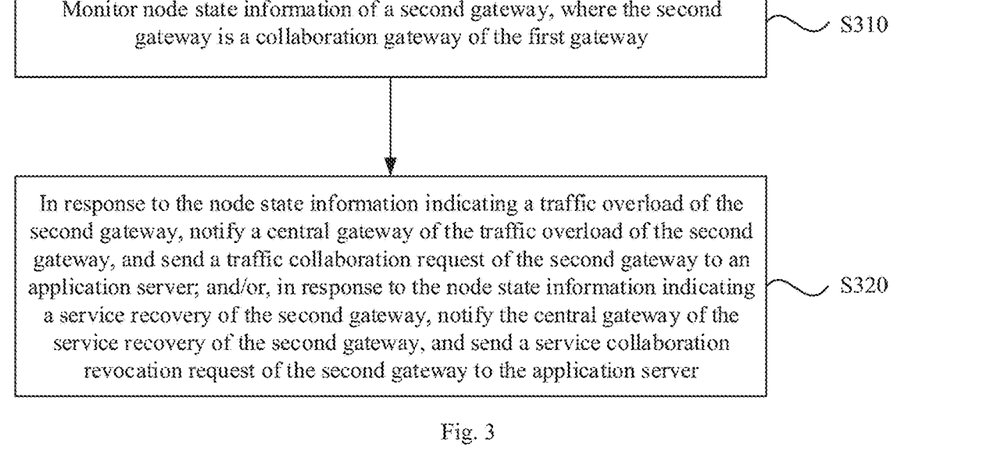
FIG. 3 is a flowchart of a congestion control method according to the present disclosure.

In an implementation, FIG. 3 is a flowchart of a congestion control method according to the present disclosure. The method can be applied to network congestion in mMTC. The method can be executed by the congestion control apparatus applied to the first gateway provided by the present disclosure, and the congestion control apparatus can be implemented by software and/or hardware and is integrated in a gateway.

As shown in FIG. 3, a congestion control method according to the present disclosure is applied to a first gateway, and includes the following steps.

At S310, node state information of a second gateway is monitored, where the second gateway is a collaboration gateway of the first gateway.

Any gateway in the network except the central gateway can be called the first gateway, and the collaboration gateway of the first gateway is called the second gateway. Each first gateway monitors the node state information of its collaboration gateway(s) (that is, the second gateway(s)), for example, monitors the application information or device information of its collaboration gateway(s), which may specifically be node bandwidth information, whether it is overloaded, device running speed and so on.

At S320, in response to the node state information indicating a traffic overload of the second gateway, a central gateway is notified of the traffic overload of the second gateway, and a traffic collaboration request of the second gateway is sent to an application server; and/or, in response to the node state information indicating a traffic recovery of the second gateway, the central gateway is notified of the traffic recovery of the second gateway, and a traffic collaboration revocation request of the second gateway is sent to the application server.

The first gateway can determine whether the traffic congestion state of the second gateway is traffic overload or traffic recovery according to the node state information of the second gateway.

In an implementation, when learning that the traffic load of the second gateway reaches a first preset threshold according to the node state information of the second gateway, the first gateway can confirm the traffic overload of the second gateway.

In an implementation, when learning that the traffic load of the second gateway is lower than the first preset threshold or a second preset threshold according to the node state information of the second gateway, the first gateway can confirm the traffic recovery of the second gateway.

Here, the threshold values for the first gateway to confirm the traffic overload or recovery of the second gateway may be the same, for example, using the first preset threshold for both cases; alternatively, the threshold values for the first gateway to confirm the traffic overload or recovery of the second gateway may be different, for example, the first preset threshold is used to confirm traffic overload and the second preset threshold is used to confirm traffic recovery, the second preset threshold being lower than the first preset threshold.

The first gateway (for example, gateway A) determines whether the traffic load of its collaboration gateway (for example, gateway B) reaches the first preset threshold according to the received node state information of the second gateway (gateway B), and if so, the first gateway sends a notification message to the central gateway of the network to notify the central gateway of the traffic overload of the second gateway (gateway B), and sends the traffic collaboration request of the second gateway (gateway B) to the application server. In an implementation, the traffic collaboration request is configured to request the application server to forward a traffic message of the second gateway, that is, gateway A requests the application server to forward the traffic message of gateway B.

After receiving the notification of the traffic overload of the second gateway sent by the first gateway, the central gateway adjusts the collaboration relationship between managed gateways according to the network state of the current network, specifically according to the topology state and/or node state of the current network.

Optionally, the central gateway reassigns a collaboration gateway (e.g., gateway C) to the first gateway (i.e., gateway A) according to the topology state and/or node state of the current network. Optionally, if it is determined that there are some gateways in the current network that do not have the optimal collaboration gateways according to the topology state and/or node state of the current network, the central gateway reassigns collaboration gateways to these gateways, that is, the reassigned collaboration gateways of these gateways are superior to their original collaboration gateways.

Further, after adjusting the collaboration relationship between managed gateways, the central gateway sends the collaboration relationship update message to the application server. After receiving the collaboration relationship update message sent by the central gateway, the application server updates gateway collaboration relationship configuration information of the corresponding network.

After receiving the traffic collaboration request of the second gateway (gateway B) sent by the first gateway (gateway A), the application server performs traffic forwarding setting for the second gateway (gateway B). In an implementation, the application server searches locally for presence of any suspended traffic message of the second gateway (gateway B) according to an identifier of the second gateway (gateway B), and forwards the suspended traffic message of the second gateway to the first gateway in response to presence of the suspended traffic message, or sets a forwarding flag for the second gateway (gateway B) in response to no presence of any suspended traffic message, the forwarding flag being configured to indicate that the traffic message of the second gateway is to be forwarded. In an implementation, after setting the forwarding flag for the second gateway (gateway B), if a traffic message needs to be sent to the second gateway (gateway B), then a current collaboration gateway of the second gateway (gateway B) is determined according to the gateway collaboration relationship configuration information of the network where the second gateway (gateway B) is located, and the traffic message of the second gateway (gateway B) is forwarded to the current collaboration gateway, so as to solve the congestion problem of the second gateway (gateway B).

Here, the collaboration gateway of the second gateway (gateway B) changes according to the adjustment by the central gateway to the collaboration relationship between managed gateways, in which case the current collaboration gateway of the second gateway (gateway B) may be gateway A or gateway D (gateway D is the collaboration gateway reassigned by the central gateway to gateway B), and when the application server needs to send the traffic message to the second gateway (gateway B), the traffic message of the second gateway (gateway B) is forwarded to the current collaboration gateway of the second gateway (gateway B), namely gateway A or gateway D.

Further, the current collaboration gateway (gateway A or gateway D) of the second gateway (gateway B) determines whether the traffic of its collaboration gateway (gateway B) is recovered according to the node state information of the second gateway (gateway B) it receives. Specifically, it can be determined whether the traffic load of the second gateway (gateway B) is lower than the first preset threshold or the second preset threshold according to the node state information of the second gateway (gateway B), and if so, a notification message is sent to the central gateway of the network to notify the central gateway of the traffic recovery of the second gateway (gateway B), and the traffic collaboration revocation request of the second gateway (gateway B) is sent to the application server. In an implementation, the traffic collaboration revocation request is configured to request the application server to revoke the forwarding of the traffic message of the second gateway, that is, gateway A or gateway D requests the application server to revoke the forwarding of the traffic message of gateway B.

In an implementation, gateway A sends the notification of the traffic overload of gateway B to the central gateway and the traffic collaboration request of gateway B to the application server; suppose that while the application server performs traffic forwarding setting for gateway B, the central gateway changes the collaboration gateway of gateway B from gateway A to gateway D, then when the central gateway notifies gateway D, it will also inform gateway D that gateway B is currently in the traffic overload state, and after a collaboration relationship is established between gateway D and gateway B, gateway D will receive the traffic message of gateway B forwarded by the application server, and determine, by monitoring the node state information of gateway B, whether the traffic of gateway B is recovered; and after confirming the traffic recovery of gateway B, gateway D will notify the central gateway of the traffic recovery of the second gateway (gateway B), and send the traffic collaboration revocation request of the second gateway (gateway B) to the application server.

After receiving the notification of the traffic recovery of the second gateway (gateway B) sent by the first gateway (gateway A or gateway D), the central gateway adjusts the collaboration relationship between managed gateways according to the network state of the current network, specifically according to the topology state and/or node state of the current network.

Optionally, if it is determined that there are some gateways in the current network that do not have the optimal collaboration gateways according to the topology state and/or node state of the current network, the central gateway reassigns collaboration gateways to these gateways, that is, the reassigned collaboration gateways of these gateways are superior to their original collaboration gateways.

Further, after adjusting the collaboration relationship between managed gateways, the central gateway sends the collaboration relationship update message to the application server. After receiving the collaboration relationship update message sent by the central gateway, the application server updates gateway collaboration relationship configuration information of the corresponding network.

After receiving the traffic collaboration revocation request of the second gateway (gateway B) sent by the first gateway (gateway A or gateway D), the application server performs traffic forwarding revocation setting for the second gateway (gateway B). Specifically, according to the identifier of the second gateway (gateway B), the application server searches locally for presence of a forwarding flag set for the second gateway (gateway B), and if the forwarding flag exists, the application server revokes the forwarding flag for the second gateway (gateway B).

It is worth pointing out that gateway A, gateway B, gateway C and gateway D involved in the present disclosure are all the first gateways mentioned in the present disclosure, all of which can implement the congestion control method applied to the first gateway according to the present disclosure.

According to the above technical scheme, congestion control of the collaboration gateway is realized, where the gateway may be an IoT border gateway, so as to realize the congestion control processing capability of the IoT border gateway, thus meeting the further demand of the 5G IoT application for the IoT border gateway.

Figure 4:
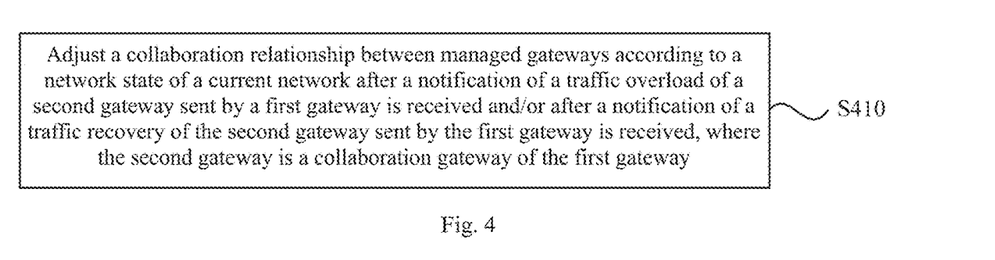
FIG. 4 is a flowchart of a congestion control method according to the present disclosure.

In an implementation, FIG. 4 is a flowchart of a congestion control method according to the present disclosure. The method can be applied to network congestion in mMTC. The method can be executed by the congestion control apparatus applied to the central gateway according to the present disclosure, and the congestion control apparatus can be implemented by software and/or hardware and is integrated in a gateway.

As shown in FIG. 4, a congestion control method according to the present disclosure is applied to a central gateway, and includes the following steps.

At S410, after a notification of a traffic overload of a second gateway sent by a first gateway is received, and/or after a notification of a traffic recovery of the second gateway sent by the first gateway is received, a collaboration relationship between managed gateways is adjusted according to a network state of a current network, where the second gateway is a collaboration gateway of the first gateway.

After receiving the notification of the traffic overload of the second gateway sent by the first gateway, and/or after receiving the notification of the traffic recovery of the second gateway sent by the first gateway, the central gateway adjusts the collaboration relationship between managed gateways according to the network state of the current network, specifically according to the topology state and/or node state of the current network.

Optionally, according to the topology state and/or node state of the current network, the central gateway reassigns a collaboration gateway to the first gateway that sends the notification of the traffic overload and/or traffic recovery of the second gateway.

Optionally, if it is determined that there are some gateways in the current network that do not have the optimal collaboration gateways according to the topology state and/or node state of the current network, the central gateway reassigns collaboration gateways to these gateways, that is, the reassigned collaboration gateways of these gateways are superior to their original collaboration gateways.

In an implementation, after adjusting the collaboration relationship between managed gateways, the central gateway sends the collaboration relationship update message to the application server. After receiving the collaboration relationship update message sent by the central gateway, the application server updates gateway collaboration relationship configuration information of the corresponding network.

Please refer to the previous implementation for details that are not explained in this implementation, which will not be repeated here.

According to the above technical scheme, congestion control of the collaboration gateway is realized, where the gateway may be an IoT border gateway, so as to realize the congestion control processing capability of the IoT border gateway, thus meeting the further demand of the 5G IoT application for the IoT border gateway.

Figure 5:
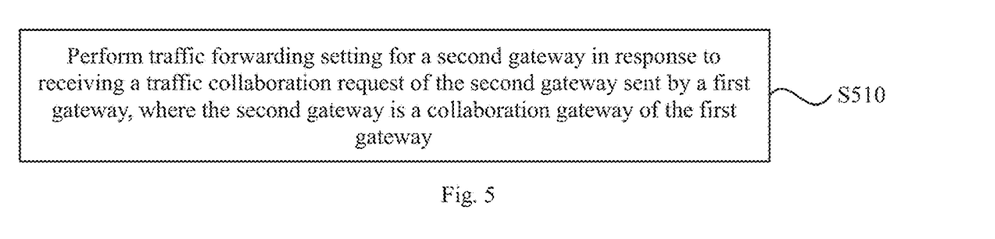
FIG. 5 is a flowchart of a congestion control method according to the present disclosure.

In an implementation, FIG. 5 is a flowchart of a congestion control method according to the present disclosure. The method can be applied to network congestion in mMTC. The method can be executed by the congestion control apparatus applied to the application server provided by the present disclosure, and the congestion control apparatus can be implemented by software and/or hardware and is integrated in a gateway.

As shown in FIG. 5, a congestion control method according to the present disclosure is applied to an application server, and includes the following steps.

At S510, traffic forwarding setting is performed for a second gateway in response to receiving a traffic collaboration request of the second gateway sent by a first gateway, where the second gateway is a collaboration gateway of the first gateway.

In an implementation, the traffic collaboration request is configured to request the application server to forward the traffic message of the second gateway.

In an implementation, the application server performing traffic forwarding setting for the second gateway specifically includes: searching for presence of any suspended traffic message of the second gateway; and forwarding the suspended traffic message of the second gateway to the first gateway in response to presence of the suspended traffic message, or setting a forwarding flag for the second gateway in response to no presence of any suspended traffic message, the forwarding flag being configured to indicate that the traffic message of the second gateway is to be forwarded.

Further, after setting the forwarding flag for the second gateway, the application server determines, in response to a traffic message needing to be sent to the second gateway, a current collaboration gateway of the second gateway according to gateway collaboration relationship configuration information of the network where the second gateway is located, and forwards the traffic message of the second gateway to the current collaboration gateway.

In an implementation, the application server receives a collaboration relationship update message sent by the central gateway, and updates the gateway collaboration relationship configuration information according to the collaboration relationship update message.

Further, in response to receiving a traffic collaboration revocation request of the second gateway sent by the first gateway, traffic forwarding revocation setting is performed for the second gateway.

In an implementation, the traffic collaboration revocation request is configured to request the application server to revoke the forwarding of the traffic message of the second gateway.

In an implementation, the application server performing traffic forwarding revocation setting for the second gateway may specifically include: searching for presence of a forwarding flag set for the second gateway; and revoking the forwarding flag for the second gateway in response to the presence of the forwarding flag.

Please refer to the previous implementation for details that are not explained in this implementation, which will not be repeated here.

According to the above technical scheme, congestion control of the collaboration gateway is realized, where the gateway may be an IoT border gateway, so as to realize the congestion control processing capability of the IoT border gateway, thus meeting the further demand of the 5G IoT application for the IoT border gateway.

Figure 6:
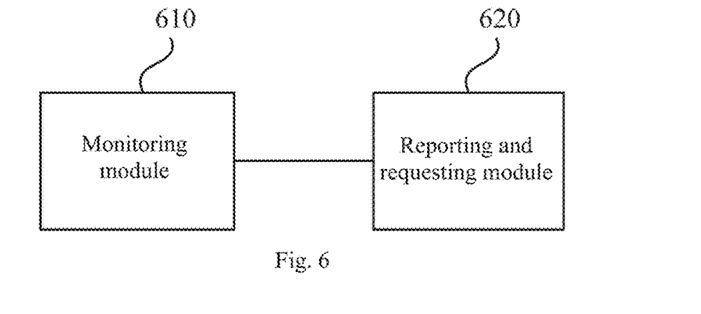
FIG. 6 is a schematic diagram of a congestion control apparatus according to the present disclosure.

The present embodiment also provides a congestion control apparatus. FIG. 6 is a schematic diagram of a congestion control apparatus according to the present disclosure. As shown in FIG. 6, a congestion control apparatus provided by the present embodiment is applied to a first gateway, and includes a monitoring module 610 and a reporting and requesting module 620.

The monitoring module 610 is configured to monitor node state information of a second gateway, where the second gateway is a collaboration gateway of the first gateway.

The reporting and requesting module 620 is configured to, in response to the node state information indicating a traffic overload of the second gateway, notify a central gateway of the traffic overload of the second gateway, and send a traffic collaboration request of the second gateway to an application server; and/or, in response to the node state information indicating a traffic recovery of the second gateway, notify the central gateway of the traffic recovery of the second gateway, and send a traffic collaboration revocation request of the second gateway to the application server.

The congestion control apparatus applied to the first gateway provided by the present embodiment is used for realizing the congestion control method applied to the first gateway as described in the embodiment of the present disclosure. The implementation principle and technical effects of the congestion control apparatus applied to the first gateway provided by the present embodiment are similar to those of the congestion control method applied to the first gateway as described in the embodiment of the present disclosure, and will not be repeated here.

In an implementation, the traffic collaboration request is configured to request the application server to forward the traffic message of the second gateway.

In an implementation, the traffic collaboration revocation request is configured to request the application server to revoke the forwarding of the traffic message of the second gateway.

In an implementation, the node state information indicating the traffic overload of the second gateway includes:
the node state information indicates that the traffic load of the second gateway reaches a first preset threshold.

In an implementation, the node state information indicating the traffic recovery of the second gateway includes: the node state information indicating that the traffic load of the second gateway is lower than the first preset threshold or a second preset threshold.

Figure 7:
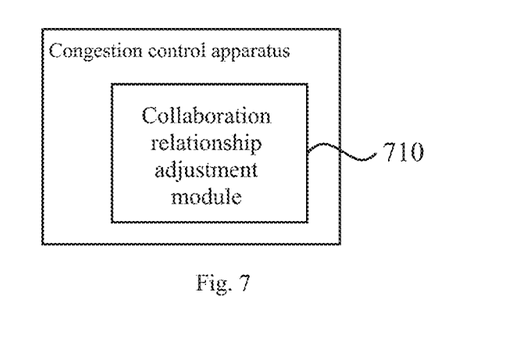
FIG. 7 is a schematic diagram of a congestion control apparatus according to the present disclosure.

The present embodiment also provides a congestion control apparatus. FIG. 7 is a schematic diagram of a congestion control apparatus according to the present disclosure. As shown in FIG. 7, a congestion control apparatus provided by the present embodiment is applied to a central gateway, and includes a collaboration relationship adjustment module 710.

The collaboration relationship adjustment module 710 is configured to adjust a collaboration relationship between managed gateways according to a network state of a current network after receiving a notification of a traffic overload of a second gateway sent by a first gateway and/or after receiving a notification of a traffic recovery of the second gateway sent by the first gateway, where the second gateway is a collaboration gateway of the first gateway.

The congestion control apparatus applied to the central gateway provided by the present embodiment is used for realizing the congestion control method applied to the central gateway as described in the embodiment of the present disclosure. The implementation principle and technical effects of the congestion control apparatus applied to the central gateway provided by the present embodiment are similar to those of the congestion control method applied to the central gateway as described in the embodiment of the present disclosure, and will not be repeated here.

In an implementation, the above apparatus further includes: an update message sending module configured to send a collaboration relationship update message to the application server after adjusting the collaboration relationship between managed gateways.

Figure 8:
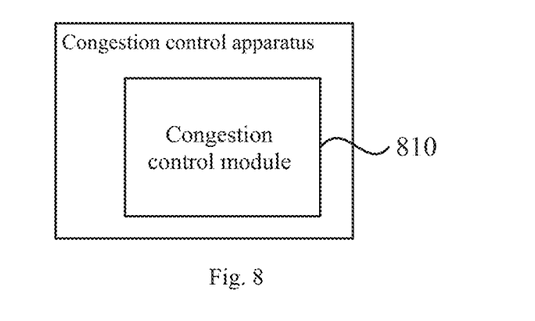
FIG. 8 is a schematic diagram of a congestion control apparatus according to the present disclosure.

The present embodiment also provides a congestion control apparatus. FIG. 8 is a schematic diagram of a congestion control apparatus according to the present disclosure. As shown in FIG. 8, a congestion control apparatus provided by the present embodiment is applied to an application server, and includes a congestion control module 810.

The congestion control module 810 is configured to perform traffic forwarding setting for a second gateway in response to receiving a traffic collaboration request of the second gateway sent by a first gateway, where the second gateway is a collaboration gateway of the first gateway.

The congestion control apparatus applied to the application server provided by the present embodiment is used for realizing the congestion control method applied to the application server as described in the embodiment of the present disclosure. The implementation principle and technical effects of the congestion control apparatus applied to the application server provided by the present embodiment are similar to those of the congestion control method applied to the application server as described in the embodiment of the present disclosure, and will not be repeated here.

In an implementation, the traffic collaboration request is configured to request the application server to forward the traffic message of the second gateway.

Further, the above apparatus further includes: a congestion control revocation module configured to perform traffic forwarding revocation setting for the second gateway in response to receiving a traffic collaboration revocation request of the second gateway sent by the first gateway.

In an implementation, the traffic collaboration revocation request is configured to request the application server to revoke the forwarding of the traffic message of the second gateway.

In an implementation, the congestion control module 810 is specifically configured to search for presence of any suspended traffic message of the second gateway; and forward the suspended traffic message of the second gateway to the first gateway in response to presence of the suspended traffic message, or set a forwarding flag for the second gateway in response to no presence of any suspended traffic message, the forwarding flag being configured to indicate that the traffic message of the second gateway is to be forwarded.

In an implementation, the congestion control module 810 is further specifically configured to, after setting the forwarding flag for the second gateway, determine, in response to a traffic message needing to be sent to the second gateway, a current collaboration gateway of the second gateway according to gateway collaboration relationship configuration information of the network where the second gateway is located, and forward the traffic message of the second gateway to the current collaboration gateway.

In an implementation, the above apparatus further includes: a collaboration relationship configuration update module configured to receive a collaboration relationship update message sent by the central gateway, and update the gateway collaboration relationship configuration information according to the collaboration relationship update message.

In an implementation, the congestion control revocation module is specifically configured to search for presence of a forwarding flag set for the second gateway, and revoke the forwarding flag for the second gateway in response to the presence of the forwarding flag.

Figure 9:
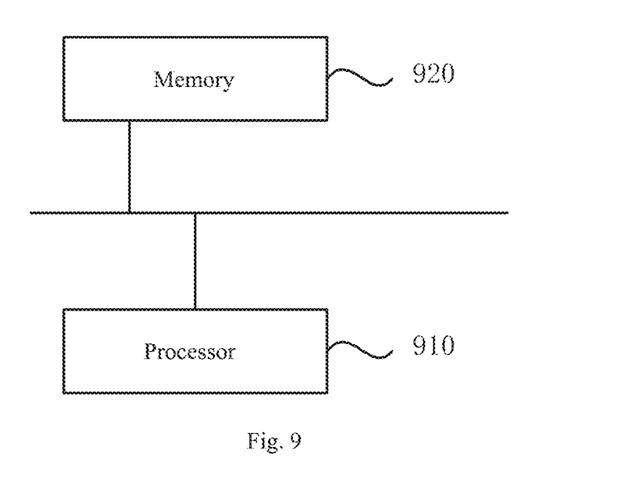
FIG. 9 is a schematic diagram of a gateway according to the present disclosure.

An embodiment of the present disclosure provides a gateway. FIG. 9 is a schematic diagram of a gateway according to the present disclosure. As shown in FIG. 9, the gateway according to the present disclosure includes: at least one processor 910 and a memory 920. The gateway may be provided with one or more processors 910, while one processor 910 is shown as an example in FIG. 9. The memory 920 is configured to store at least one program. The at least one program, when executed by the at least one processor 910, causes the at least one processor 910 to implement the congestion control method applied to the first gateway or the congestion control method applied to the central gateway as described in the embodiments of the present invention.

The processor 910 and the memory 920 in the gateway can be connected by a bus or in other ways. In FIG. 9, the connection is realized by a bus as an example.

The memory 920, as a computer-readable storage medium, may be configured to store software programs, computer-executable programs and modules, such as program instructions/modules corresponding to the congestion control method applied to the first gateway as described in the embodiment of the present disclosure (for example, the monitoring module 610 and the reporting and requesting module 620 in the congestion control apparatus applied to the first gateway), and program instructions/modules corresponding to the congestion control method applied to the central gateway as described in the embodiment of the present disclosure (for example, the collaboration relationship adjustment module 710 in the congestion control apparatus applied to the central gateway). The memory 920 may include a storage program area and a storage data area, where the storage program area may store an operating system and application program(s) required by at least one function, and the storage data area may store data created according to the use of a device, etc. In addition, the memory 920 may include a high-speed random access memory and a non-volatile memory, for example, at least one magnetic disk storage device, a flash memory device, or another non-volatile solid-state storage device. In some examples, the memory 920 may further include memories remotely located with respect to the processor 910, and these remote memories may be connected to communication nodes via a network. Examples of the above-mentioned network include the Internet, an intranet, a local area network, a mobile communication network, and a combination thereof.

Figure 10:
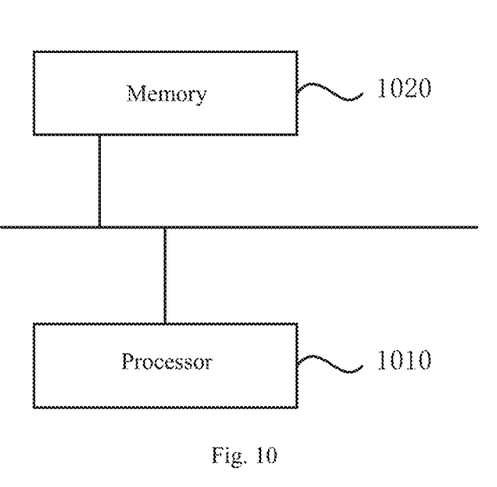
FIG. 10 is a schematic diagram of an application server according to the present disclosure.

An embodiment of the present disclosure provides an application server. FIG. 10 is a schematic diagram of an application server according to the present disclosure. As shown in FIG. 10, the application server according to the present disclosure includes: at least one processor 1010 and a memory 1020. The application server may be provided with one or more processors 1010, while one processor 1010 is shown as an example in FIG. 10. The memory 1020 is configured to store at least one program. The at least one program, when executed by the at least one processor 1010, causes the at least one processor 1010 to implement the congestion control method applied to the application server as described in the embodiment of the present invention.

The processor 1010 and the memory 1020 in the application server can be connected by a bus or in other ways. In FIG. 10, the connection is realized by a bus for example.

The memory 1020, as a computer-readable storage medium, can be configured to store software programs, computer-executable programs and modules, such as program instructions/modules corresponding to the congestion control method applied to the application server as described in the embodiment of the present disclosure (for example, the congestion control module 810 in the congestion control apparatus applied to the application server). The memory 1020 may include a storage program area and a storage data area, where the storage program area may store an operating system and application program(s) required by at least one function, and the storage data area may store data created according to the use of a device, etc. In addition, the memory 1020 may include a high-speed random access memory and a non-volatile memory, for example, at least one magnetic disk storage device, a flash memory device, or another non-volatile solid-state storage device. In some examples, the memory 1020 may further include memories remotely located with respect to the processor 1010, and these remote memories may be connected to communication nodes via a network. Examples of the above-mentioned network include the Internet, an intranet, a local area network, a mobile communication network, and a combination thereof.

A further embodiment of the present disclosure provides a non-transitory computer-readable storage medium storing a computer program which, when executed by a processor, implements the congestion control method applied to the first gateway, the congestion control method applied to the central gateway or the congestion control method applied to the application server as described in any one of the embodiments of the present disclosure.

Here, a congestion control method applied to a first gateway includes: monitoring node state information of a second gateway, where the second gateway is a collaboration gateway of the first gateway; and in response to the node state information indicating a traffic overload of the second gateway, notifying a central gateway of the traffic overload of the second gateway, and sending a traffic collaboration request of the second gateway to an application server; and/or, in response to the node state information indicating a traffic recovery of the second gateway, notifying the central gateway of the traffic recovery of the second gateway, and sending a traffic collaboration revocation request of the second gateway to the application server.

A congestion control method applied to a central gateway includes: adjusting a collaboration relationship between managed gateways according to a network state of a current network, after a notification of a traffic overload of a second gateway sent by a first gateway is received and/or after a notification of a traffic recovery of the second gateway sent by the first gateway is received, where the second gateway is a collaboration gateway of the first gateway.

A congestion control method applied to an application server includes: performing traffic forwarding setting for a second gateway in response to receiving a traffic collaboration request of the second gateway sent by a first gateway, where the second gateway is a collaboration gateway of the first gateway.

A further embodiment of the present disclosure provides a congestion control system, including: an application server, a central gateway and at least one first gateway.

The central gateway is connected with the application server and each first gateway, and is configured to adjust a collaboration relationship between managed gateways according to a network state of a current network and send a collaboration relationship update message of the current network to the application server.

The first gateway is connected with the application server and the second gateway, and is configured to monitor node state information of the second gateway, notify the central gateway of a traffic overload or recovery of the second gateway according to the node state information, and send a traffic collaboration request or traffic collaboration revocation request of the second gateway to the application server, where the second gateway is a collaboration gateway of the first gateway.

The application server is configured to perform traffic forwarding setting for the second gateway in response to receiving the traffic collaboration request of the second gateway sent by the first gateway, or perform traffic forwarding revocation setting for the second gateway in response to receiving the traffic collaboration revocation request of the second gateway sent by the first gateway.

Specifically, the first gateway monitors the node state information of the second gateway, where the second gateway is a collaboration gateway of the first gateway; in response to the node state information indicating a traffic overload of the second gateway, a central gateway is notified of the traffic overload of the second gateway, and a traffic collaboration request of the second gateway is sent to an application server; and/or, in response to the node state information indicating a service recovery of the second gateway, the central gateway is notified of the service recovery of the second gateway, and a service collaboration revocation request of the second gateway is sent to the application server.

Here, the traffic collaboration request is configured to request the application server to forward the traffic message of the second gateway; and the traffic collaboration revocation request is configured to request the application server to revoke the forwarding of the traffic message of the second gateway.

In an implementation, the node state information indicating the traffic overload of the second gateway includes: the node state information indicates that the traffic load of the second gateway reaches a first preset threshold.

In an implementation, the node state information indicating the traffic recovery of the second gateway includes: the node state information indicating that the traffic load of the second gateway is lower than the first preset threshold or a second preset threshold.

Specifically, the central gateway adjusts a collaboration relationship between managed gateways according to a network state of a current network, after receiving a notification of a traffic overload of a second gateway sent by a first gateway, and/or after receiving a notification of a traffic recovery of the second gateway sent by the first gateway, where the second gateway is a collaboration gateway of the first gateway.

Further, after adjusting the collaboration relationship between managed gateways, the central gateway sends the collaboration relationship update message to the application server.

Specifically, the application server performs traffic forwarding setting for the second gateway in response to receiving a traffic collaboration request of a second gateway sent by a first gateway, where the second gateway is a collaboration gateway of the first gateway.

In an implementation, the traffic collaboration request is configured to request the application server to forward the traffic message of the second gateway.

Further, in response to receiving a traffic collaboration revocation request of the second gateway sent by the first gateway, the application server performs traffic forwarding revocation setting for the second gateway.

In an implementation, the traffic collaboration revocation request is configured to request the application server to revoke the forwarding of the traffic message of the second gateway.

In an implementation, when performing traffic forwarding setting for the second gateway, the application server searches for presence of any suspended traffic message of the second gateway; and forwards the suspended traffic message of the second gateway to the first gateway in response to presence of the suspended traffic message, or sets a forwarding flag for the second gateway in response to no presence of any suspended traffic message, the forwarding flag being configured to indicate that the traffic message of the second gateway is to be forwarded.

In an implementation, after setting the forwarding flag for the second gateway, the application server determines, in response to a traffic message needing to be sent to the second gateway, a current collaboration gateway of the second gateway according to gateway collaboration relationship configuration information of the network where the second gateway is located, and forwards the traffic message of the second gateway to the current collaboration gateway.

In an implementation, the application server receives the collaboration relationship update message sent by the central gateway, and updates the gateway collaboration relationship configuration information according to the collaboration relationship update message.

In an implementation, when performing traffic forwarding revocation setting for the second gateway, the application server searches for presence of a forwarding flag set for the second gateway; and revokes the forwarding flag for the second gateway in response to the presence of the forwarding flag.

According to the above technical scheme, congestion control of the collaboration gateway is realized, where the gateway may be an IoT border gateway, so as to realize the congestion control processing capability of the IoT border gateway, thus meeting the further demand of the 5G IoT application for the IoT border gateway.

Figure 11:
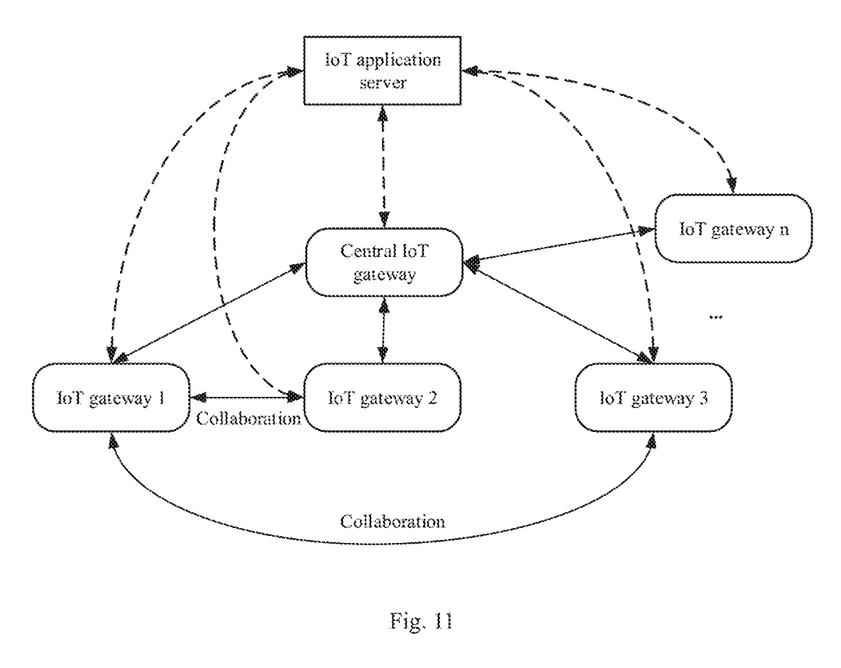
FIG. 11 is a schematic diagram of a congestion control system according to the present disclosure.

An implementation is given below by taking an IoT border gateway as the gateway. The schematic diagram of the corresponding congestion control system is shown in FIG. 11, and the specific implementations are as follows.

A congestion control stage is provided, which includes the following steps.

At step 101, an IoT gateway (gateway A) receives node state information of its collaboration IoT gateway (gateway B).

At step 102, the IoT gateway (gateway A) determines whether the traffic load of its collaboration gateway (gateway B) reaches a preset threshold (threshold a) according to the received node state information, and if so, sends a notification message to a central gateway of the IoT network to notify the central gateway of the traffic overload of its collaboration IoT gateway (gateway B).

At step 103, after receiving the notification message, the central IoT gateway reassigns a collaboration gateway (gateway C) to the IoT gateway (gateway A) according to the topology state and/or node state of the current IoT network. If there are some IoT gateways in the IoT network (the current collaboration gateways of such IoT gateways are not optimal), collaboration gateways are reassigned to these IoT gateways.

At step 104, the central IoT gateway sends a collaboration relationship update message to an IoT application server, and the IoT application server updates IoT gateway collaboration relationship configuration information of the IoT network.

At step 105, the IoT gateway (gateway A) sends a traffic collaboration request message to the IoT application server, requesting the forwarding of a traffic message of its collaboration IoT gateway (gateway B).

At step 106, after receiving the traffic collaboration request message, the IoT application server searches locally for presence of any suspended traffic message of the collaboration IoT gateway (gateway B) according to an identifier of the collaboration IoT gateway (gateway B): if any suspended traffic message exists, step 106*a* is executed; and otherwise, step 106*b* is executed.

At step 106*a*, the IoT application server forwards the suspended traffic message of the collaboration IoT gateway (gateway B) to the IoT gateway (gateway A).

At step 106*b*, the IoT application server sets locally a forwarding flag for the collaboration IoT gateway (gateway B), and when a traffic message needs to be sent to the collaboration IoT gateway (gateway B), the IoT application server searches for a current collaboration IoT gateway (possibly gateway A or D) of the collaboration IoT gateway (gateway B) in the IoT gateway collaboration relationship configuration information of the IoT network according to the identifier of the collaboration IoT gateway (gateway B), and sends the traffic message of the collaboration gateway (gateway B) to the current collaboration IoT gateway (gateway A or D).

A congestion control revocation stage is provided, which includes the following steps.

At step 107, the current collaboration IoT gateway (gateway A or D) receives node state information of its collaboration IoT gateway (gateway B).

At step 108, the current collaboration IoT gateway (gateway A or D) determines whether the traffic load of its collaboration gateway (gateway B) is lower than a preset threshold (threshold a orb) according to the received node state information, and if so, sends a notification message to a central gateway of the IoT network to notify the central gateway of the traffic recovery of its collaboration IoT gateway (gateway B).

At step 109, after receiving the notification message, if it is determined that there are some IoT gateways in the IoT network (the current collaboration gateways of such IoT gateways are not optimal) according to the topology state and/or node state of the current IoT network, the central IoT gateway reassigns collaboration gateways to these IoT gateways.

At step 110, the central IoT gateway sends a collaboration relationship update message to the IoT application server so as to update IoT gateway collaboration relationship configuration information of the IoT network.

At step 111, the current collaboration IoT gateway (gateway A or D) sends a traffic collaboration revocation request message to the IoT application server, requesting the revocation of the forwarding of the traffic message of its collaboration IoT gateway (gateway B).

At step 112, after receiving the traffic collaboration revocation request message, the IoT application server searches locally for presence of a forwarding flag set for the collaboration IoT gateway (gateway B) according to the identifier of the collaboration IoT gateway (gateway B), and revokes the forwarding flag set for the collaboration IoT gateway (gateway B) in response to the presence of the forwarding flag.

The above-described embodiments are only example embodiments of the present disclosure, and are not intended to limit the scope of protection of the present disclosure.

Those having ordinary skill in the art should understand that the term "user terminal" covers any suitable type of wireless user equipment, such as mobile phones, portable data processing equipment, portable web browsers or vehicle-mounted mobile stations.

Generally speaking, various embodiments of the present disclosure can be implemented in hardware or dedicated circuits, software, logic or any combination thereof. For example, some aspects can be implemented in hardware, while other aspects can be implemented in firmware or software that can be executed by a controller, a microprocessor or another computing device. However, the present disclosure is not limited thereto.

Embodiments of the present disclosure can be implemented by a data processor of a mobile device executing computer program instructions, for example, in a processor entity, or by hardware, or by a combination of software and hardware. The computer program instructions may be assembly instructions, instruction set architecture (ISA) instructions, machine instructions, machine-related instructions, microcode, firmware instructions, state setting data or source code or object code written in any combination of one or more programming languages.

The block diagram of any logic process in the drawings of the present disclosure can represent program steps, or can represent interconnected logic circuits, modules and functions, or can represent a combination of program steps and logic circuits, modules and functions. The computer program may be stored in a memory. The memory may be of any type that is suitable for a local technical environment and can be implemented using any suitable data storage technology, for example but not limited to, a read-only memory (ROM), a random-access memory (RAM), optical storage devices and systems (a digital versatile disk (DVD) or a compact disk (CD)). The computer-readable medium may include a non-transitory storage medium. The data processor may be any type suitable for the local technical environment, for example but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

The invention claimed is:

1. A congestion control method applied to a first gateway, comprising:
    monitoring node state information of a second gateway, wherein the second gateway is a collaboration gateway of the first gateway; and
    in response to the node state information indicating a traffic overload of the second gateway, notifying a central gateway of the traffic overload of the second gateway, and sending a traffic collaboration request of the second gateway to an application server, wherein the traffic collaboration request is configured to request the application server to forward a traffic message of the second gateway; and
    in response to the node state information indicating a service recovery of the second gateway, notifying the central gateway of the service recovery of the second gateway, and sending a service collaboration revocation request of the second gateway to the application server.

2. The method of claim 1, wherein the traffic collaboration revocation request is configured to request the application server to revoke the forwarding of a traffic message of the second gateway.

3. The method of claim 1, wherein the node state information indicating the traffic overload of the second gateway comprises:
    the node state information indicating that the traffic load of the second gateway reaches a first preset threshold.

4. The method of claim 1, wherein the node state information indicating the traffic recovery of the second gateway comprises:
    the node state information indicating that the traffic load of the second gateway is lower than a first preset threshold or a second preset threshold, the second preset threshold being lower than the first preset threshold.

5. A non-transitory computer-readable storage medium storing a computer program which, when executed by a processor, causes the processor to perform the congestion control method of claim 1.

6. A congestion control method applied to a central gateway, comprising:
    adjusting a collaboration relationship between managed gateways according to a network state of a current network, after at least one of: receiving a notification of a traffic overload of a second gateway sent by a first gateway, or receiving a notification of a traffic recovery of the second gateway sent by the first gateway, wherein the second gateway is a collaboration gateway of the first gateway, and the first gateway is configured to send a traffic collaboration request of the second gateway to an application server in response to the traffic overload of the second gateway, and wherein the traffic collaboration request is configured to request the application server to forward a traffic message of the second gateway.

7. The method of claim 6, after adjusting the collaboration relationship between managed gateways, the method further comprising:
sending a collaboration relationship update message to an application server.

8. A non-transitory computer-readable storage medium storing a computer program which, when executed by a processor, causes the processor to perform the congestion control method of claim 6.

9. A congestion control method applied to an application server, comprising:
in response to receiving a traffic collaboration request of a second gateway sent by a first gateway, performing traffic forwarding setting for the second gateway, wherein the traffic collaboration request is configured to request the application server to forward a traffic message of the second gateway;
in response to receiving a traffic collaboration revocation request of the second gateway sent by the first gateway, performing traffic forwarding revocation setting for the second gateway;
wherein the second gateway is a collaboration gateway of the first gateway.

10. The method of claim 9, wherein the traffic collaboration revocation request is configured to request the application server to revoke the forwarding of a traffic message of the second gateway.

11. The method of claim 9, wherein performing traffic forwarding setting for the second gateway comprises:
searching for presence of a suspended traffic message of the second gateway; and
forwarding the suspended traffic message of the second gateway to the first gateway in response to presence of the suspended traffic message of the second gateway; or
setting a forwarding flag for the second gateway in response to absence of a suspended traffic message of the second gateway, the forwarding flag being configured to indicate that the traffic message of the second gateway is to be forwarded.

12. The method of claim 11, after setting the forwarding flag for the second gateway, the method further comprising:
in response to a traffic message needing to be sent to the second gateway, determining a current collaboration gateway of the second gateway according to gateway collaboration relationship configuration information of the network where the second gateway is located, and forwarding the traffic message of the second gateway to the current collaboration gateway.

13. The method of claim 12, further comprising:
receiving a collaboration relationship update message sent by a central gateway, and
updating the gateway collaboration relationship configuration information according to the collaboration relationship update message.

14. The method of claim 9, wherein performing traffic forwarding revocation setting for the second gateway comprises:
searching for presence of a forwarding flag set for the second gateway; and revoking the forwarding flag for the second gateway in response to the presence of the forwarding flag set for the second gateway.

15. A non-transitory computer-readable storage medium storing a computer program which, when executed by a processor, causes the processor to perform the congestion control method of claim 9.

* * * * *